(12) United States Patent
Sundara et al.

(10) Patent No.: US 9,229,930 B2
(45) Date of Patent: Jan. 5, 2016

(54) NORMALIZED RANKING OF SEMANTIC QUERY SEARCH RESULTS

(75) Inventors: Seema Sundara, Nashua, NH (US); Matthew Steven Perry, Brookline, NH (US); Souripriya Das, Nashua, NH (US); Jagannathan Srinivasan, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 98 days.

(21) Appl. No.: 13/595,125

(22) Filed: Aug. 27, 2012

(65) Prior Publication Data

US 2014/0059043 A1 Feb. 27, 2014

(51) Int. Cl.
G06F 17/30 (2006.01)
(52) U.S. Cl.
CPC .......... *G06F 17/30* (2013.01); *G06F 17/30958* (2013.01)
(58) Field of Classification Search
CPC ................................................ G06F 17/30958
USPC ................................................ 707/747, 748
See application file for complete search history.

(56) References Cited

U.S. PATENT DOCUMENTS

| | | | |
|---|---|---|---|
| 7,668,804 B1* | 2/2010 | El-Helw et al. | 707/719 |
| 7,979,455 B2* | 7/2011 | Krishnamoorthy et al. | 707/761 |
| 8,527,517 B1* | 9/2013 | Ait-Mokhtar | 707/738 |
| 2005/0251805 A1* | 11/2005 | Bamba et al. | 718/100 |
| 2007/0203865 A1* | 8/2007 | Hirsch | 706/46 |
| 2008/0040308 A1* | 2/2008 | Ranganathan et al. | 707/1 |
| 2008/0294978 A1* | 11/2008 | Klintsov et al. | 715/234 |
| 2010/0205199 A1* | 8/2010 | Lin et al. | 707/765 |
| 2011/0040717 A1* | 2/2011 | Rho et al. | 706/50 |
| 2011/0099174 A1* | 4/2011 | Chappell et al. | 707/741 |
| 2011/0202526 A1* | 8/2011 | Lee et al. | 707/726 |
| 2012/0158791 A1* | 6/2012 | Kasneci et al. | 707/798 |
| 2012/0221324 A1* | 8/2012 | Machii et al. | 704/9 |
| 2013/0018652 A1* | 1/2013 | Ferrucci et al. | 704/9 |

OTHER PUBLICATIONS

W3C, SPARQL Query Language for RDF, Jan. 15, 2008, pp. 1-103.*
Souripriya Das et al., "Making Unstructured Data SPARQL Using Semantic Indexing in Oracle Database" ICDE 2012, Apr. 5, 2012, 12 pages.

* cited by examiner

Primary Examiner — Jorge A Casanova
(74) Attorney, Agent, or Firm — Vista IP Law Group, LLP (57) ABSTRACT

A method, system, and computer program product for normalized ranking of semantic query search results. The method commences by forming a SPARQL query, the SPARQL query specifying a collection of named RDF graphs, then executing the SPARQL query to retrieve matched documents selected from the collection of named RDF graphs. Having retrieved the matches, the method calculates an absolute normalized score for the matched document. The calculation of an absolute normalized score for a second matched document allows for relevance ranking. To enhance the relationship of the computer-calculated score to the relevance (and not solely to occurrence counts) embodiments consider the number of distinct variables selected in the SPARQL query, and also consider the total number of bindings to the aforementioned variables. For comparing from among possibly different sized documents, a further normalization component is implemented by considering the total number of triples found in the document's underlying subgraph.

30 Claims, 8 Drawing Sheets

```
SELECT SEM_CONTAINS_SCORE(1),
       SEM_CONTAINS_COUNT(1),
       SEM_CONTAINS_SELECT(1)
FROM News
WHERE SEM_CONTAINS(text,
    'SELECT ?ct, ?m
     WHERE {?ct geo:cityName "Athens".
     ?ct geo:stateName "Georgia".
     OPTIONAL {?m :mayorOf ?ct }}',
    'SEM_EXTR', NULL, 1) > 0
ORDER BY
SEM_CONTAINS_SCORE(1) DESC;
```

NORMALIZED RANKING OF SEMANTIC QUERY SEARCH RESULTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of information retrieval using a semantic content search operator and more particularly to techniques for normalized ranking of semantic query search results.

BACKGROUND

Some embodiments of the present disclosure are directed to an approach for implementing normalized ranking of semantic query search results.

Ranking of query results using lexical ranking often employs techniques to count the number of occurrences of a particular lexical term (e.g., a search term, an indexed search term, etc.) and ranks a plurality of matching documents based on the occurrence count. In contrast, semantic searching for matching documents places more emphasis on the meaning within the documents. Thus, merely ranking a plurality of matching documents based on the occurrence count is deficient for ranking the relevance of documents returned from a semantic query.

Given the aforementioned deficiencies of such lexical ranking techniques, and further deficiencies in applying such lexical ranking techniques to rank results of semantic queries, consideration of these deficiencies in the context of retrieval of documents based on unstructured data gives rise to the need for semantic indexing and ranking based on semantic constructions that relate a subject, a property, and an object into a "triple". Such use of triples in indexing and retrieving documents based on semantic queries is an area of focus for standardization organizations such as W3C, however legacy techniques for ranking need to be improved upon when ranking search results from a semantic query.

Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for normalized ranking of semantic query search results.

Presented herein are methods, systems, and computer program products for performing normalized ranking of semantic query search results. The method commences by forming a SPARQL query, the SPARQL query specifying a collection of named RDF graphs, then executing the SPARQL query to retrieve matched documents selected from the collection of named RDF graphs. Having retrieved the matches, the method calculates an absolute normalized score for the matched documents. The calculation of an absolute normalized score for a second matched document allows for relevance ranking between the matched documents.

The absolute normalized score for the matched documents does not depend on the number of matched results returned from the query. To further enhance the relationship of the computer-calculated score to the relevance as would be ascribed by a human, certain embodiments consider the number of distinct variables selected in the SPARQL query, and also consider the total number of bindings to the aforementioned variables.

Some embodiments use the absolute normalized score in order to limit the number of documents returned to the user—that is, by returning only such matched document that have a sufficiently high absolute normalized score.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing normalized ranking of semantic query search results. More particularly, disclosed herein are environments, methods, and systems for implementing normalized ranking of semantic query search results.

Overview

Certain commercial database systems support use of semantic data repositories (e.g., an RDF repository), and some such commercial embodiments support search operators specifically designed for retrieving semantic content from such repositories. In some commercial database system deployments, certain supported query constructions allow searching semantic content for matching documents. For example, some such deployments support extracting semantic data from an RDF repository in the form of RDF triples. Such triples can be extracted from unstructured text using semantic queries (e.g., SPARQL queries). Executing such a query would return matching documents corresponding to the specified SPARQL query (e.g., comprising one or more graph patterns). However, legacy techniques do not provide any means for ranking the matched documents. Such a ranking or scoring based on a relevance score measure is felicitous for allowing matching documents to be presented in decreasing order of relevance, as well as to limit the extent of matching documents to be presented based on score threshold.

One possibility is to form a score based on a "semantic ratio". For example, a semantic ratio can be formed by counting the number of triples in a particular matching document and dividing by the maximum number of triples that occur in any of the matching documents. Such a semantic ratio provides a relative ranking from among a set of matching documents, however herein disclosed are improved techniques including techniques for calculating an absolute normalized ranking of matching documents.

RDF Concepts

Various descriptions of the figures use certain known-in-the-art terms, some of which are heretofore discussed:

RDF Triple: The basic unit of data stored in RDF is a <subject, predicate, object> triple that describes the value (object) of a property (predicate) of a resource (subject). A triple is also seen as an edge in a directed, labeled graph (see below), where a directed edge, labeled predicate, connects the subject node to the object node. The value (object) can itself be a simple value or can be a resource.

Resource: A resource is identified by a URI (uniform resource identifier) and simple values are specified using RDF literals.

An RDF graph is a set of RDF triples. An RDF graph may optionally be identified by a URI. Such a graph is referred to as a named graph. An RDF graph without an identifier is referred to as an unnamed graph. For example, Table 1 shows RDF triples contained in two named graphs (":gMA" and ":gNY").

TABLE 1

Sample RDF data

| ID | Graph URI | Subject | Predicate | Object |
|---|---|---|---|---|
| a | :gMA | :ma1 | rdf:type | :City |
| b | :gMA | :ma1 | geo:name | "Action" |
| c | :gMA | :ma3 | ref:type | :State |
| d | :gMA | :ma3 | geo:name | "MA" |
| p | :gNY | :ny1 | ref:type | :City |
| q | :gNY | :ny1 | geo:name | "New York" |
| r | :gNY | :ny2 | ref:type | :City |
| s | :gNY | :ny2 | geo:name | "Albany" |
| t | :gNY | :ny3 | ref:type | :State |
| u | :gNY | :ny3 | geo:name | "NY" |
| v | :gNY | :ny3 | geo:stateCap | :ny2 |

An RDF dataset is a collection of one unnamed graph (referred to as the default graph) and zero or more named graphs. The default graph can be empty.

SPARQL query language: The acronym "SPARQL" refers to a W3C recommendation for querying RDF graphs using graph patterns. The graph pattern used in a query may consist of one or more basic graph patterns (BGPs), FILTER clauses, and more complex graph patterns involving OPTIONAL and UNION clauses. A query uses variables (denoted with prefix ?) in the graph pattern and returns solutions, each solution consisting of bindings for (some of) the variables specified in the SELECT list. Each solution represents a matching subgraph consisting of the set of triples (edges) that identify a match with the graph pattern in the query.

Matching and Solutions: Consider the following query to evaluate against each of the RDF graphs of Table 1. Note that the RDF graphs of Table 1 are given using URIs as are specified in the FROM NAMED clauses:

SELECT ?g ?city ?state
FROM NAMED :gMA FROM NAMED :gNY
WHERE {GRAPH ?g {?ct rdf:type :City .
 ?ct geo:name ?city .
 OPTIONAL {?st geo:StateCap ?ct .
 ?st geo:name ?state }}}

The solutions are shown in Table 2. Inspection of the solutions given in Table 2 as resulted from application of the above query shows that multiple matching subgraphs can be found in a single named graph. Specifically, there are two solutions ($2^{nd}$ and $3^{rd}$ row) for graph :gNY. The solution in the $2^{nd}$ row returns a (non-NULL) binding for ?state due to a match with the OPTIONAL clause.

TABLE 2

| Matching result subgraph | | | |
|---|---|---|---|
| Triples in Matching Subgraph | ?go | ?city | ?state |
| [a, b] | :gMA | "Action" | |
| [r, s, v, u] | :gNY | "Albany" | "NY" |
| [p, q] | :gNY | "New York" | |

Binding: A binding is a variable, value pair such as in the pair expression {variableName, variableValue}. A SPARQL query returns a set of solutions, where each solution comprises a set of bindings. When the binding values in a solution are substituted for their corresponding variables in the query pattern, the result is a set of RDF triples that exists in the query dataset.

Given an understanding of the above concepts, reference is now made in detail to certain embodiments. The disclosed embodiments are not intended to be limiting of the claims.

DESCRIPTIONS OF EXEMPLARY EMBODIMENTS

Figure 1A:
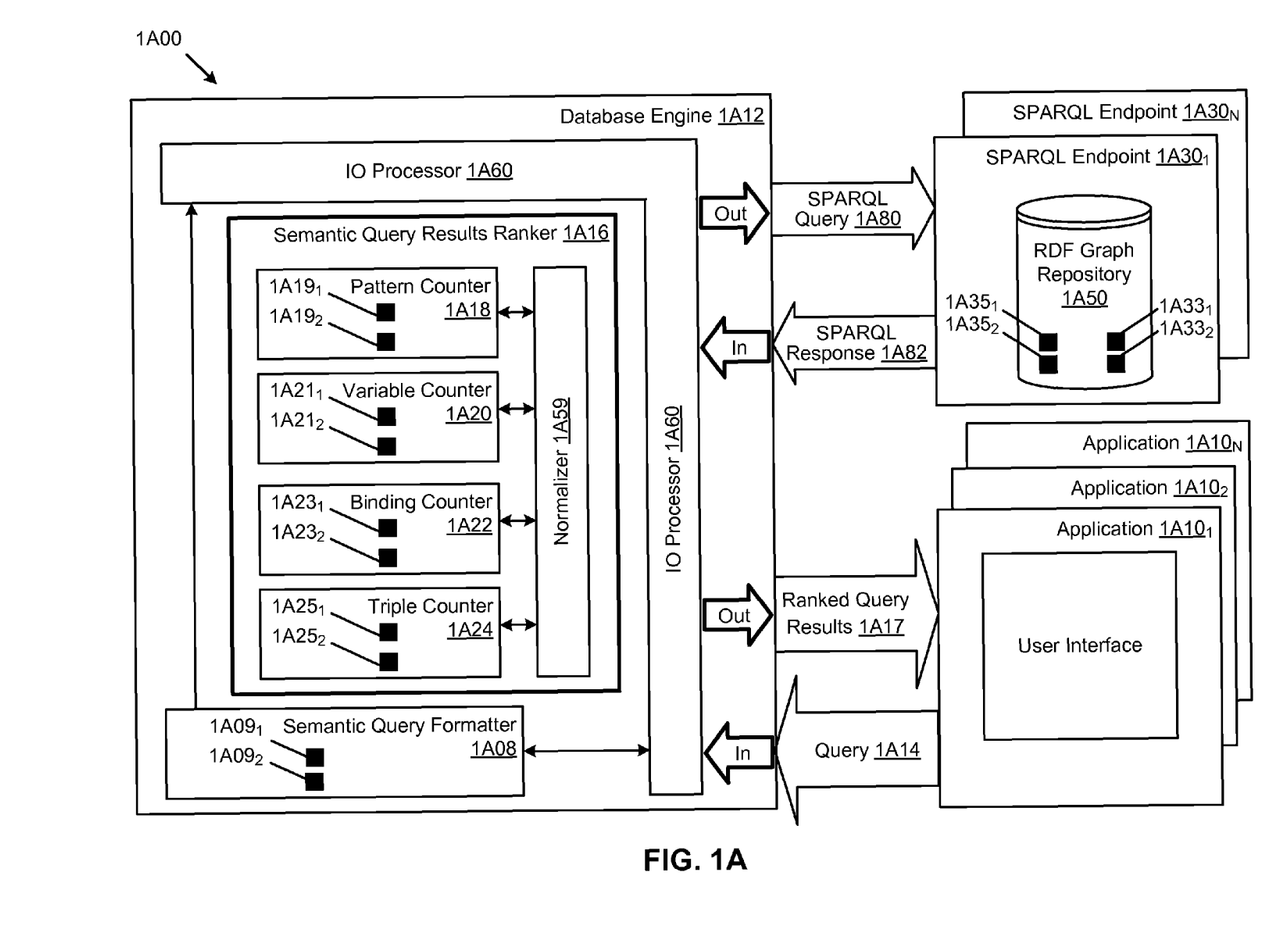
FIG. 1A is a diagram of an environment for performing normalized ranking of semantic query search results, according to some embodiments.

FIG. 1A is a diagram of an environment 1A00 for performing normalized ranking of semantic query search results. As an option, the present environment 1A00 may be implemented in the context of the architecture and functionality of the embodiments described herein. Also, the environment 1A00 or any aspect therein may be implemented in any desired environment.

As shown, an application (e.g., application $1A10_1$, application $1A10_2$, application $1A10_N$, etc.) can be operated by a user or agent, and can transmit a query 1A14 to a database engine 1A12 for processing. In general the application will receive query results, and more particularly, following the techniques disclosed herein, the application would receive any one or more instances of ranked query results 1A17.

A database engine 1A12 can host a storage facility (e.g., a hard drive or array of hard drives, or other storage), or can interface with a storage area network (SAN) or network attached storage (NAS), or can interface with any number of varieties of local or remote storage. For example, and as shown, the database engine 1A12 can interface with a remote SPARQL endpoint (e.g., remote SPARQL endpoint 1A30$_1$, remote SPARQL endpoint 1A30$_N$, etc.) by sending a SPARQL query 1A80 to the remote SPARQL endpoint and thenceforth receiving a SPARQL response 1A82. A database engine 1A12 can host an IO processor 1A60, which IO processor serves to facilitate communication between and to and from any modules external to the database engine. Moreover an IO processor 1A60 can serve to facilitate communication between and to and from any modules internal to the database engine. For example, A SPARQL response 1A82 might be received by the IO processor 1A60, and some portion or all of the SPARQL response is passed to a semantic query results ranker 1A16. The semantic query results ranker 1A16 performs processing, and passes normalized results (e.g., in the form of ranked query results 1A17) to be delivered to the calling application.

In some cases a query 1A14 is formatted as a properly-formatted semantic query (e.g., using any one or more of the aforementioned semantic query constructions), or a query 1A14 can be processed and formatted by a semantic query formatter 1A08. A semantic query formatter 1A08 can pass a properly formatted semantic query (e.g., a SPARQL query 1A80) to the IO processor 1A60, which in turn submits the query to one or more SPARQL endpoints.

Now, the results of processing a SPARQL query 1A80 can comprise a list of document IDs for those documents that match the query. Or, the results of processing a SPARQL query 1A80 can comprise a list of document IDs together with counts and statistics regarding the matching documents. Such counts and statistics can include (but are not limited to) pattern counts, variable counts, binding counts, triple counts, etc.). Such counts and statistics are further described below.

A query 1A14 can be formatted as a properly-formatted semantic query using query constructions (e.g., query construction 1A09$_1$, query construction 1A09$_2$, etc.) as may be supported by the database engine 1A12. Some such constructions comprise syntax as is shown in Table 3.

TABLE 3

Semantic query constructions

| Construction Syntax | Synopsis |
|---|---|
| "FROM NAMED" | Refers to a named RDF graph |
| "WHERE {GRAPH [ . . . ] " | Selection criteria based on an RDF graph |
| "SEM_CONTAINS" | Selects named RDF graphs based on a query (e.g., a SPARQL query) |
| "SEM_CONTAINS_SELECT" | Returns bindings for matched RDF named graphs |
| "SEM_CONTAINS_COUNT" | Counts conjunctive triple patterns |
| "SEM_CONTAINS_SCORE" | The score (e.g., absolute, normalized score) of the subject graph |

The above constructions are briefly described infra.

A SEM_CONTAINS query can be viewed as a SPARQL query on a collection of named RDF graphs, which collection or collections (e.g., collection 1A35$_1$, collection 1A35$_2$, etc.) can be stored in an RDF graph repository 1A50. For example, SEM_CONTAINS query can be viewed as a SPARQL query over the semantic content extracted from unstructured text, stored as RDF quads (e.g., RDF quad 1A33$_1$, RDF quad 1A33$_2$, etc.), with the graph component identifying the source document. Following the foregoing disclosure, the semantic query results ranker performs ranking over the selected named graphs in decreasing order of relevance for the specified SPARQL graph pattern.

One way of ranking the named graphs is by counting the number of solutions, or solution frequency, occurring in a particular named graph corresponding to the specified SPARQL pattern. Then it is deemed that the greater number of solutions present is in proportion to a greater relevance of the named graph from the corresponding document. Such a calculation is implemented in the aforementioned SEM_CONTAINS_COUNT ranking measure. The value of SEM_CONTAINS_COUNT is calculated over a given graph pattern GP by counting the number $s_i$ of solutions found in the named graph $g_i$:

$$\text{SEM\_CONTAINS\_COUNT}(g_i) = s_i \quad (\text{EQ. 1})$$

The solution frequency measure of SEM_CONTAINS_COUNT can sometimes be understood as analogous to term frequency.

Normalization

Although the SEM_CONTAINS_COUNT measure is straightforward to compute (see EQ. 1), it is not normalized. An improved calculation technique calculates normalized rankings, which calculation technique includes the total number of bindings (as distinguished from individual triple frequencies) returned for each named graph, and includes a measure based on selected variables. As is known in the art, a SPARQL pattern may contain many variables, and the user may project only a few of them (e.g., via the SELECT clause). Some of the normalized score computations disclosed herein take into account only certain selected variables (v), such as, for example only certain selected variables as specified in a given SELECT clause.

Continuing, certain embodiments define a more comprehensive and normalized ranking measure by considering the following aspects of a SPARQL query pattern and corresponding solutions. Given a SPARQL graph pattern GP, the SEM_CONTAINS_SCORE for graph $g_i$ can be defined as follows:

$$\text{SEM\_CONTAINS\_SCORE}(g_i) = t_i/(\max(1,v)*(T_i)^n) \quad (\text{EQ. 2})$$

where:
v is the number of distinct variables selected in the query;
n is the number of triple patterns specified in the GP;
gi is a named graph;
$t_i$ is the total number of bindings (considering all solutions from $g_i$); and
$T_i$ is the total number of triples for $g_i$.

Note that the value of the denominator includes the maximum number of possible bindings. That is, value of the denominator includes the total number of n triple combinations possible considering that the Cartesian product gives the term $(T_i)^n$, and each triple in the solution can have a maximum of v bindings. The term max(1,v) is present to handle the case when no variables are selected (v=0). The numerator is calculated as the actual number of bindings (considering all solutions from the named graph).

The arithmetic bounds of EQ. 2 is in the interval [0,1], where a value of 0 is representative of no match, and a value of 1 is representative of a maximum match. However, when either of $T_i$ or n is large, the value of $(T_i)^n$ can increase out of the dynamic range of a digital computer's arithmetic logic unit (ALU). To reduce the likelihood of exceeding the dynamic range of a digital computer's ALU, some embodiments use the log of both the numerator and denominator of EQ 2. Furthermore, to avoid the possibility of division by 0 (which can occur due to the aforementioned log operation), corresponding embodiments add 1 to both the numerator and denominator to arrive at the following equation:

$$\text{SEM\_SCORE}(g_i)=(1+\log(t_i))/(1+\log(\max(1,v))+ n*\log(T_i)) \quad \text{(EQ. 3)}$$

As can now be understood, given a SPARQL query 1A80 that specified an RDF graph pattern GP, the constituent graphs of the SPARQL response 1A82 (e.g., the graphs $g_i$, $g_{i+1}$, etc.), the SEM_CONTAINS_SCORE can be calculated within the semantic query results ranker 1A16. In this embodiment, a pattern counter 1A18 is used to count or calculate n, where n is the number of triple patterns (e.g., triple pattern $1A19_1$, triple pattern $1A19_2$) specified in the GP, a variable counter 1A20 is used to count or calculate v, where v is the number of distinct variables selected (e.g., variable $1A21_1$, variable $1A21_2$, etc.) in the SPARQL query, a binding counter 1A22 is used to count or calculate the value $t_i$, where $t_i$ is the total number of bindings (e.g., binding $1A23_1$, binding $1A23_2$, etc.) considering all solutions from $g_i$, and a triple counter 1A24 is used to count or calculate $T_i$, where $T_i$ is the total number of triples for $g_i$ (e.g., triple count $1A25_1$, triple count $1A25_2$, etc.). Then, a normalizer 1A59 can calculate the ranking value, using EQ. 1 or EQ. 2.

Of course, the environment 1A00 is strictly one possible environment, and other environments are possible and disclosed herein. For example, it is possible that the SPARQL endpoint 1A30 and the database engine 1A12 are subsumed into one platform, or within one cloud. In fact, a protocol may be used to pass messages and perform operations in order to perform normalized ranking of semantic query search results. One such protocol is briefly discussed infra.

Figure 1B:
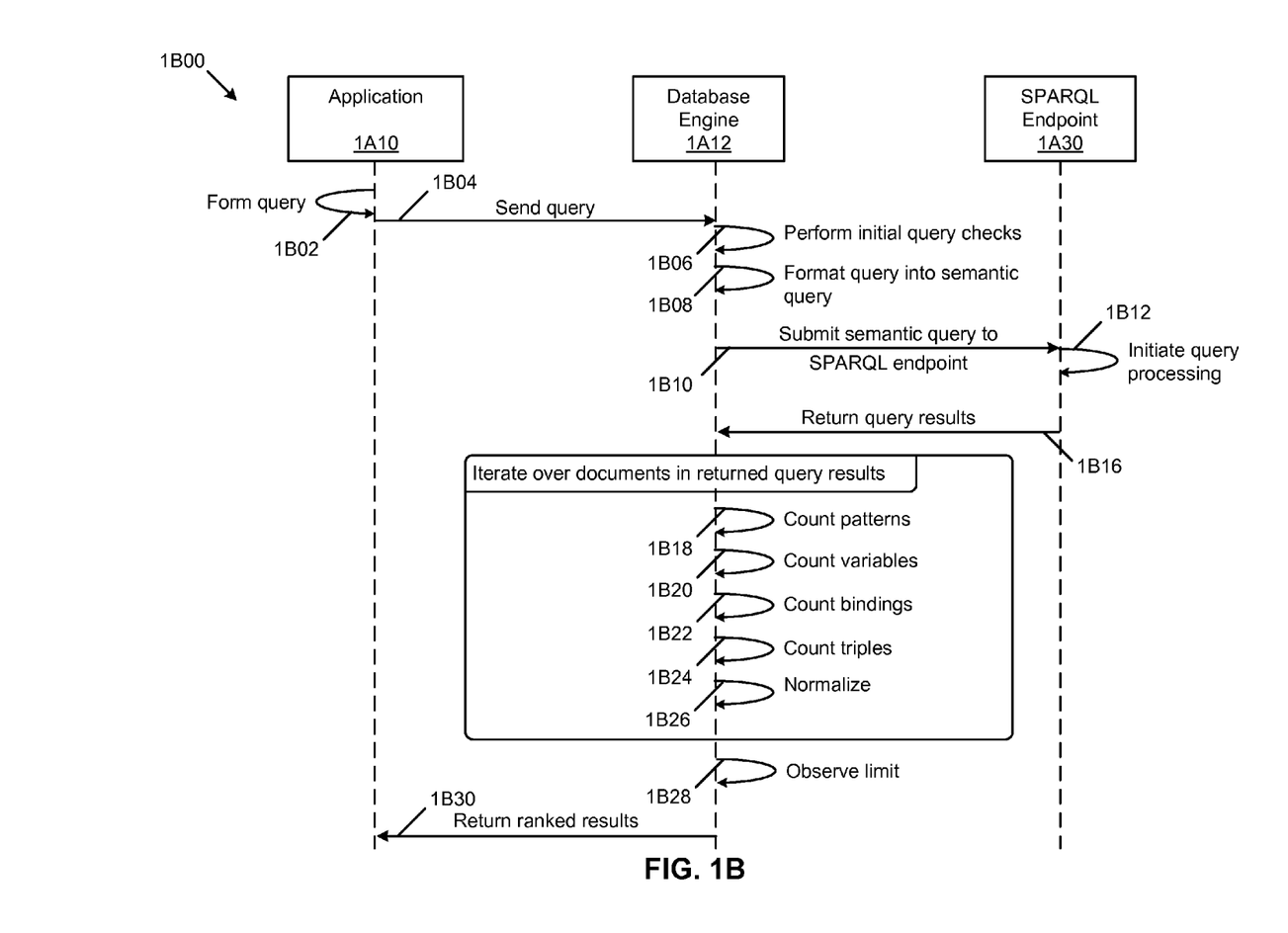
FIG. 1B is a diagram of a protocol for performing normalized ranking of semantic query search results, according to some embodiments.

FIG. 1B is a diagram of a protocol 1B00 for performing normalized ranking of semantic query search results. As an option, the present protocol 1B00 may be implemented in the context of the architecture and functionality of the embodiments described herein. Also, the protocol 1B00 or any aspect therein may be implemented in any desired environment.

As shown, the environment in which protocol 1B00 is practiced comprises an application 1A10, a database engine 1A12, and a SPARQL endpoint 1A30. Messages are passed and operations are performed as follows: The shown protocol commences as the application forms a query (see operation 1B02) and sends the query to the database engine (see message 1B04). The database engine serves to perform initial query checks (see operation 1B06), format the given query into a semantic query (see operation 1B08), and submit the semantic query to a module hosting an RDF graph repository (e.g., a SPARQL endpoint 1A30), as shown in message 1B10. The module hosting the RDF graph repository (e.g., SPARQL endpoint 1A30) can initiate query processing (see operation 1B12), and return query results as they become available (see message 1B16). At some point there are sufficient query results returned such that the returns can be ranked before passing back to the calling instance of application 1A10.

As shown, the database engine (possibly using a constituent module such as a semantic query results ranker 1A16) can iterate over the returned results (e.g., $g_i$, $g_{i+1}$, etc.) in order to count patterns (see operation 1B18), count variables (see operation 1B20), count bindings (see operation 1B22), count triples (see operation 1B24), and normalize the SEM_CONTAINS_SCORE values of the returned results (see operation 1B26).

As earlier indicated a relevance score measure is critical for allowing matching documents to be presented in decreasing order of relevance, as well as to limit the extent of matching documents to be presented based on score threshold. Accordingly, one or more operations may be performed (e.g., within database engine 1A12) so as to observe a limit (see operation 1B28). The number of matching documents presented back to the application can be based on a limit of the number of documents, or the number of matching documents presented back to the application can be limited based on filtering out (e.g., not presenting) those documents when a certain score threshold is not reached. It should be noted that the SEM_CONTAINS_SCORE values of the returned results are not dependent on the particular set of documents in the result set. In this sense the SEM_CONTAINS_SCORE values of the returned results can be considered an absolute normalized score rather than a relative score.

The ranked and limited set of graphs (and/or any other aspects of the returned results) is passed to the application 1A10 (see message 1B30).

Figure 2:
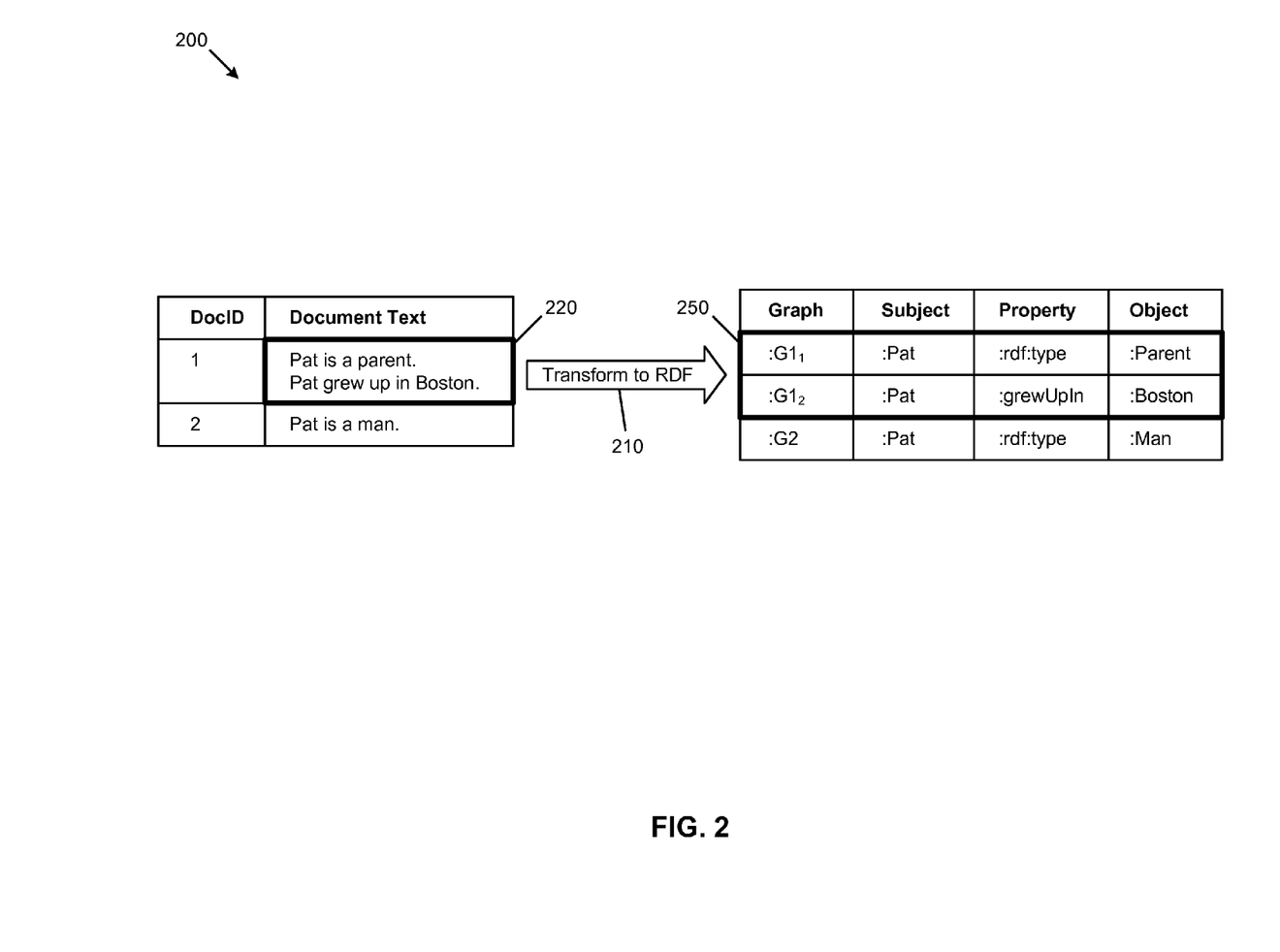
FIG. 2 is a diagram of a transformation of a given input document into a corresponding RDF graph as used in performing normalized ranking of semantic query search results, according to some embodiments.

FIG. 2 is a diagram of a transformation 200 of a given input document into a corresponding RDF graph as used in performing normalized ranking of semantic query search results. As an option, the present transformation 200 may be implemented in the context of the architecture and functionality of the embodiments described herein. Also, the transformation 200 or any aspect therein may be implemented in any desired environment.

Such a transformation of unstructured data (e.g., the shown "Document Text") can be transformed into RDF graphs and subgraphs by extracting named entities, concepts, events, or facts, and representing this information explicitly in RDF graphs. The extracted RDF data can be used for document retrieval or as input to other semantic tools. This approach has several characteristics relevant to the present disclosure:

The RDF triple representation can be used to encode virtually any set of facts.

By adding one or more ontologies (see FIG. 3), some embodiments can infer and/or refine the meaning or meanings of extracted sets of triples. In some cases additional triples can be inferred by combining the extracted triples with domain-specific ontologies and then applying further RDF semantics. The set of inferred triples expands the effective query-retrievable information extent of the documents.

The index itself can be queried, potentially for cross-document knowledge discovery.

As shown, unstructured text 220 can be transformed using transform 210, resulting in graph 250, consisting of subgraph/triple $G1_1$, and subgraph/triple $G1_2$. As mentioned above, an ontology (see FIG. 3) can be used to infer triples in order to expand the effective query-retrievable information extent of the documents.

Figure 3:
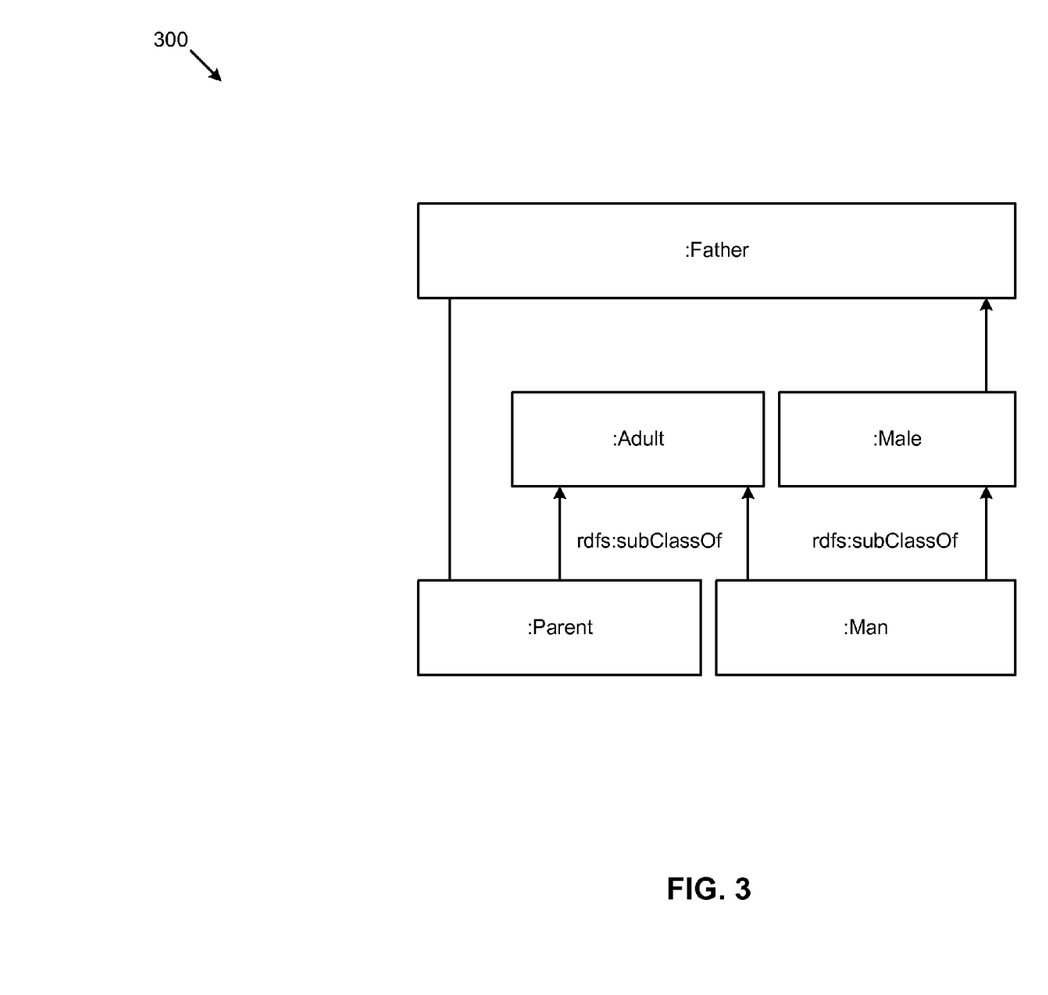
FIG. 3 is a diagram of an ontology used in interpreting an RDF graph as used in systems for normalized ranking of semantic query search results, according to some embodiments.

FIG. 3 is a diagram of an ontology 300 used in interpreting an RDF graph as used in systems for normalized ranking of semantic query search results. As an option, the present ontology 300 may be implemented in the context of the architecture and functionality of the embodiments described herein. Also, the ontology 300 or any aspect therein may be implemented in any desired environment.

The ontology itself can be transformed into triples, and the triples can be used in interpreting an RDF graph. As can be seen by inspection, a "Man" is a subclass of "Male", which fact can be transformed into an RDF triple, namely {:Man, rdfs:subClassOf, Male}. And referring to the document having DocID=2 (see FIG. 2), "Pat is a man", which can be expressed as {:Pat, rdf:type, :Man}. Combining the triples {:Pat, rdf:type, :Man} and {:Man, rdfs:subClassOf, Male}, it can be inferred that {:Pat, rdf:type, :Male}.

Figure 4:
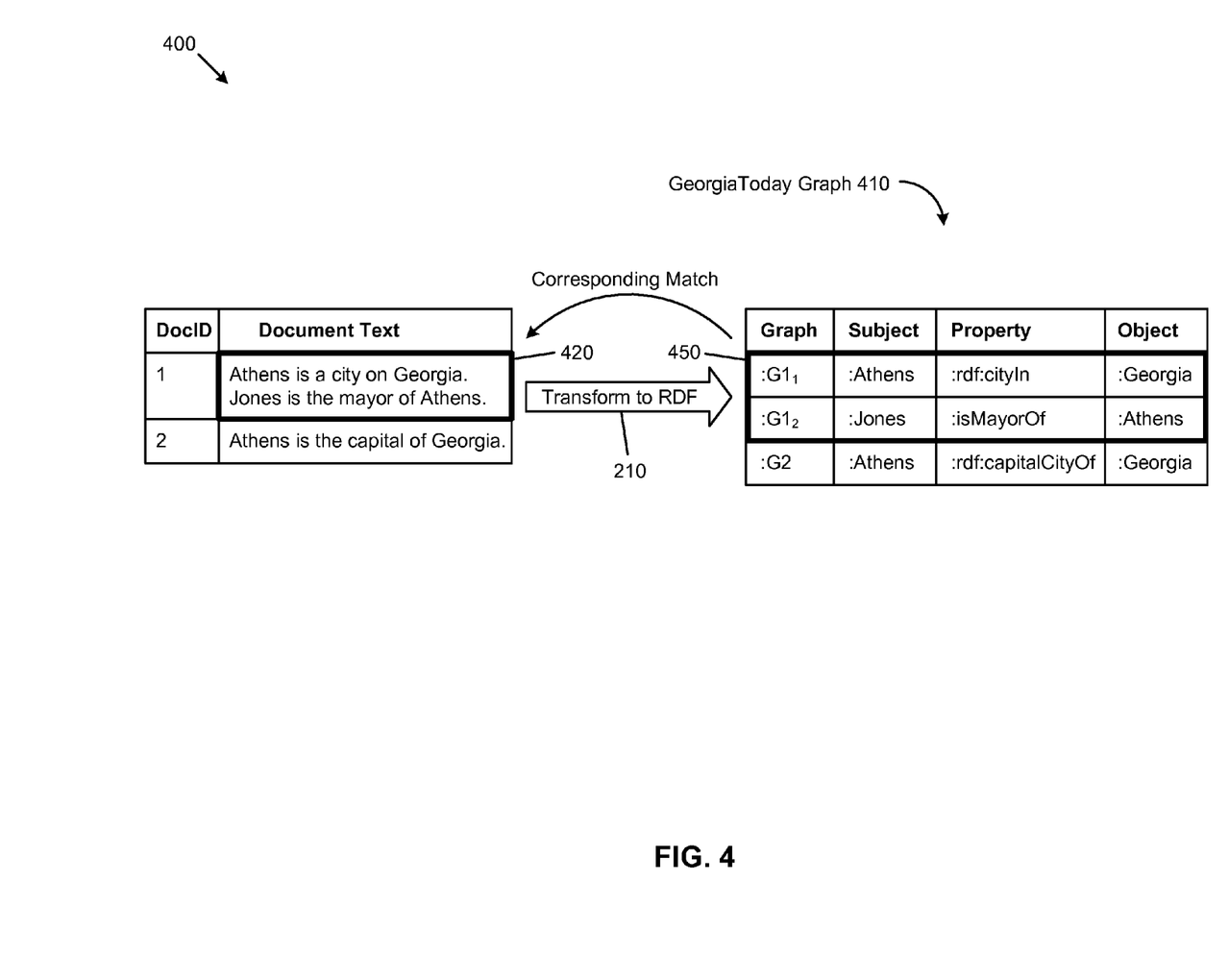
FIG. 4 is a schematic of semantic content comprising a plurality of documents as used in systems for normalized ranking of semantic query search results, according to some embodiments.

FIG. 4 is a schematic of semantic content 400 comprising a plurality of documents as used in systems for normalized ranking of semantic query search results. As an option, the present semantic content 400 may be implemented in the context of the architecture and functionality of the embodiments described herein. Also, the semantic content 400 or any aspect therein may be implemented in any desired environment.

As shown, the semantic content 400 comprises documents describing aspects of the state of Georgia (strictly for example) as found in an exemplary publication, the publication in this example being the magazine, "Georgia Today".

The depiction of FIG. 4 is similar to the depiction of FIG. 2 in that, as shown, unstructured text 420 can be transformed using transform 210, resulting in graph 450, consisting of subgraph/triple $G1_1$, and subgraph/triple $G1_2$.

Now, consider the query below that retrieves from the RDF graph, namely the GeorgiaToday Graph 410, and returns the scores for documents about the city "Athens, Ga." that also optionally matches occurrences of mayor of "Athens" (the city), in "Georgia" (the state):

```
SELECT SEM_CONTAINS_SCORE(1),
    SEM_CONTAINS_COUNT(1),
    SEM_CONTAINS_SELECT(1)
FROM GeorgiaTodayMagazine
WHERE SEM_CONTAINS(text,
    'SELECT ?ct, ?m
    WHERE {?ct geo:cityName "Athens" .
    ?ct geo:stateName "Georgia"
    OPTIONAL {?m :mayorOf ?ct }}',
    'SEM_EXTR', NULL, 1)> 0
ORDER BY SEM_CONTAINS_SCORE(1) DESC;
```

The above query is annotated and further discussed briefly infra.

Figure 5:
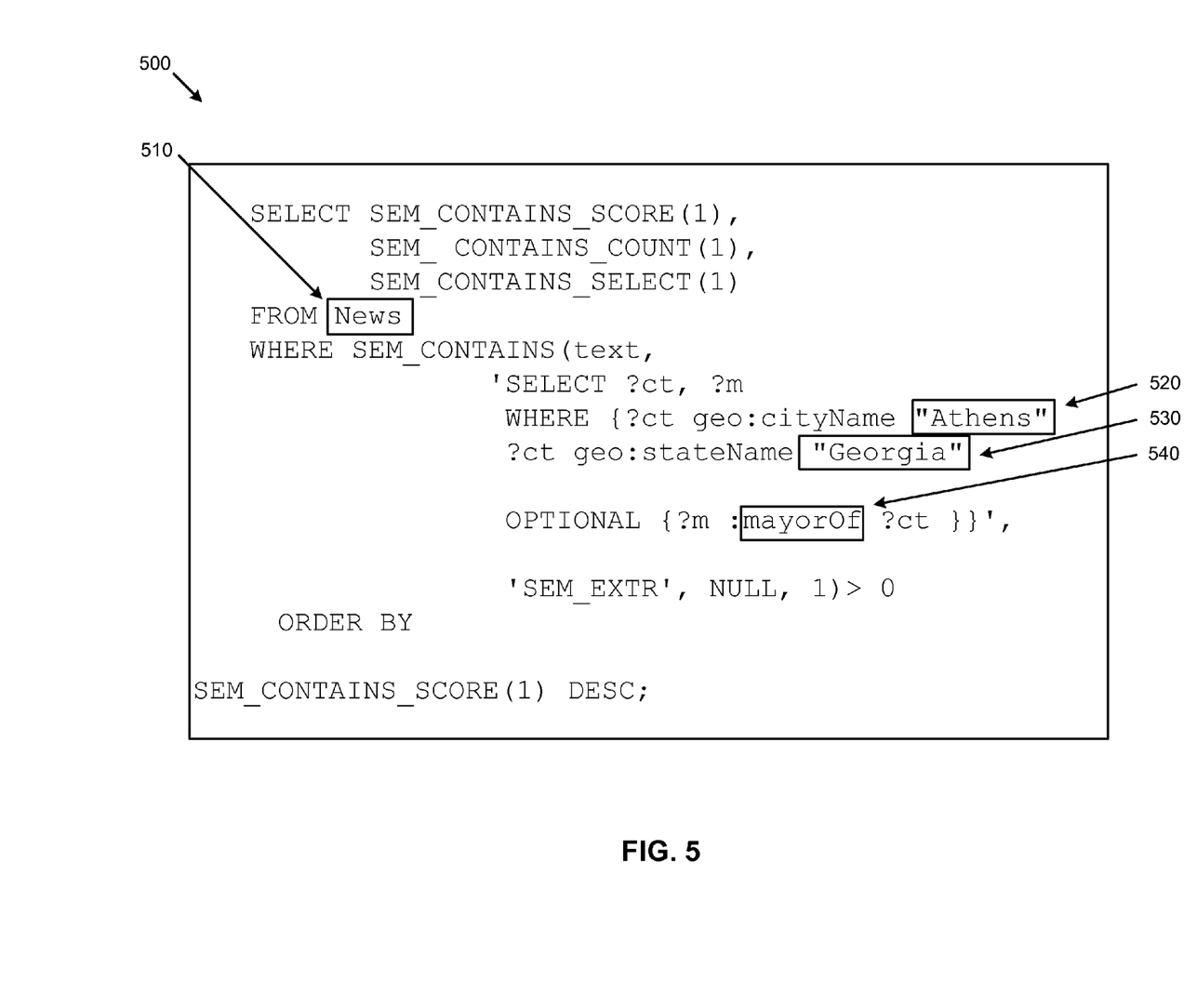
FIG. 5 is an annotated schematic of a semantic query as used in systems for normalized ranking of semantic query search results, according to some embodiments.

FIG. 5 is an annotated schematic of a semantic query 500 as used in systems for normalized ranking of semantic query search results. As an option, the present semantic query 500 may be implemented in the context of the architecture and functionality of the embodiments described herein. Also, the semantic query 500 or any aspect therein may be implemented in any desired environment.

Consider the semantic query 500, and consider that the semantic query 500, which query specifies publication or set of documents 510 (e.g., News, as shown) a ?ct variable, which must satisfy constraint 520 based on cityName ("Athens"), constraint 530 based on stateName ("Georgia") and optionally constraint 540 based on mayorOf, and a ?m variable, which much satisfy constraint 540 based on mayorOf. Consider the case where the query is applied over two named graphs $g_1$ and $g_2$ (not shown), and let the total number of triples be 10 in each. Further, let the number of solutions be 1 in each. However, let the OPTIONAL match occur only in the solution in $g_1$, so the number of bindings in the two graphs is 2 and 1, respectively. Then SEM_CONTAINS_COUNT($g_1$)=1 and SEM_CONTAINS_COUNT($g_2$)=1, whereas the normalized scores are given by:

$$\text{SEM\_CONTAINS\_SCORE}(g_1) = (1+\log(2))/(1+\log(2)+3*\log(10)) = 0.30 \quad \text{(EQ. 4)}$$

$$\text{SEM\_CONTAINS\_SCORE}(g_2) = (1+\log(1))/(1+\log(2)+3*\log(10)) = 0.23 \quad \text{(EQ. 5)}$$

Although the number of matches is the same in both graphs, the normalized score of $g_1$ is higher than that of $g_2$ because of the additional binding matched for the OPTIONAL clause against the OPTIONAL ?m variable 540. Computation of SEM_CONTAINS_SCORE for queries with UNION clauses is similar to the score computation in queries with OPTIONAL clauses.

Often, the extractors associate confidence levels that express the extraction accuracy between [0, 1] for subjects, predicates, and objects occurring in the extracted triples. In such cases, the SEM_CONTAINS_SCORE given in equation EQ. 3 still holds, except that the total count of bindings ($t_j$) is computed by summing the corresponding extraction accuracies for each of the bindings in the solution. By default, the extraction accuracy is taken as 1.

Additional Embodiments of the Disclosure

Figure 6:
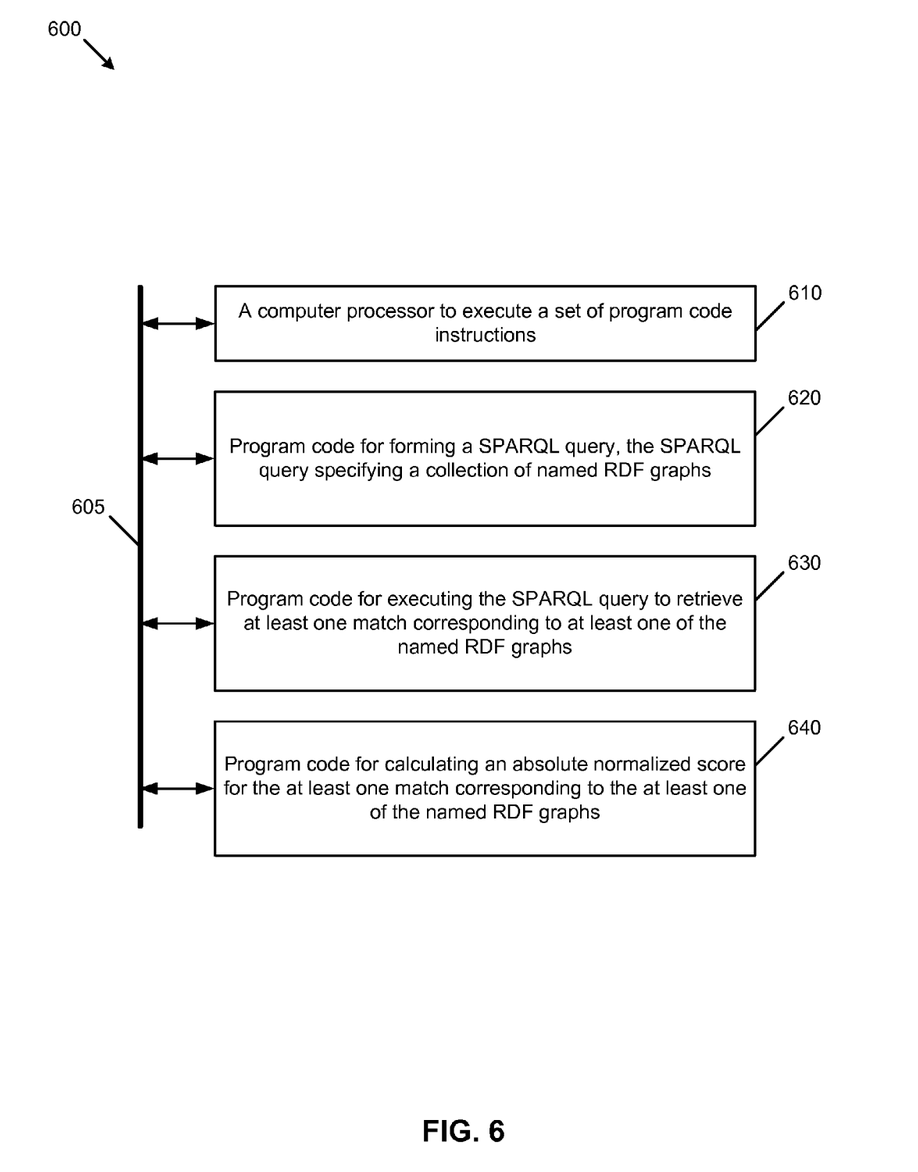
FIG. 6 depicts a block diagram of a system to perform certain functions of a computer system.

FIG. 6 depicts a block diagram of a system to perform certain functions of a computer system. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: forming a SPARQL query, the SPARQL query specifying a collection of named RDF graphs (see module 620); executing the SPARQL query to retrieve at least one match corresponding to at least one of the named RDF graphs (see module 630); and calculating an absolute normalized score for the at least one match corresponding to the at least one of the named RDF graphs (see module 640).

System Architecture Overview

Figure 7:
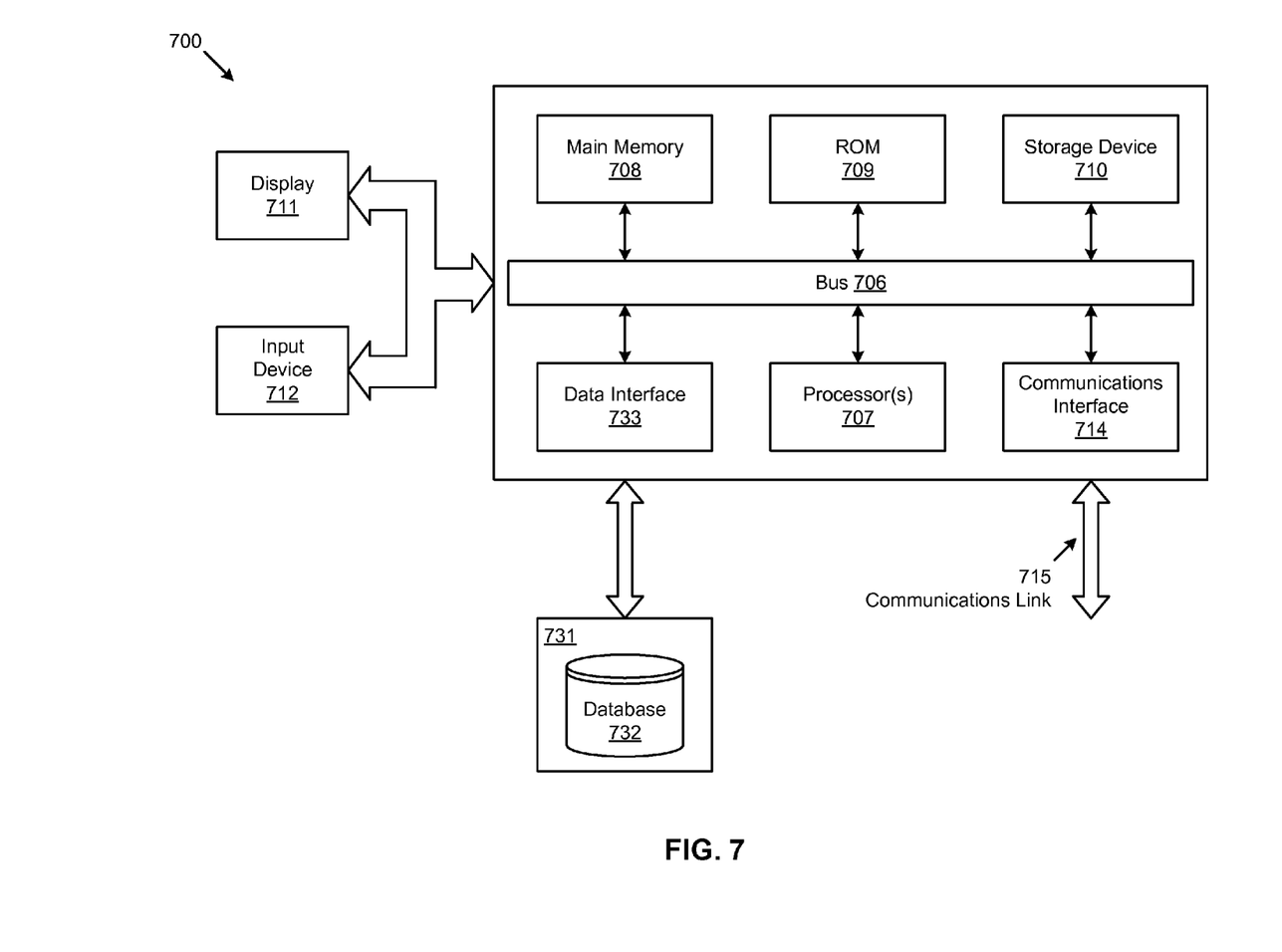
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for normalized ranking of semantic query search results, the method comprising:
    forming a SPARQL query comprising one or more graph patterns and specifying a collection of named RDF graphs;
    executing, by a computer, the SPARQL query to retrieve at least one match corresponding to at least one of the named RDF graphs;
    calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a number n where the number n is a number of triple patterns specified in the graph pattern; and
    ranking SPARQL query results based at least in part upon the normalized score for the match corresponding to the named RDF graph.

2. The method of claim 1, further comprising calculating a second normalized score for a second match.

3. The method of claim 1, further comprising filtering the search results to eliminate a result having the normalized score less than a threshold.

4. The method of claim 1, wherein the normalized score is absolute in that it is not based upon a number of named RDF graphs of the at least one of the named RDF graphs.

5. A computer implemented method for normalized ranking of semantic query search results, the method comprising:
    forming a SPARQL query comprising one or more graph patterns and specifying a collection of named RDF graphs;
    executing, by a computer, the SPARQL query to retrieve at least one match corresponding to at least one of the named RDF graphs;
    calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a number v where the number v is a number of distinct variables selected in the SPARQL query; and
    ranking SPARQL query results based at least in part upon the normalized score for the match corresponding to the named RDF graph.

6. The method of claim 5, further comprising calculating a second normalized score for a second match.

7. The method of claim 5, further comprising filtering the search results to eliminate a result having the normalized score less than a threshold.

8. The method of claim 5, wherein the normalized score is absolute in that it is not based upon a number of named RDF graphs of the at least one of the named RDF graphs.

9. A computer implemented method for normalized ranking of semantic query search results, the method comprising:
    forming a SPARQL query comprising one or more graph patterns and specifying a collection of named RDF graphs;
    executing, by a computer, the SPARQL query to retrieve at least one match corresponding to at least one of the named RDF graphs;
    calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a value $t_i$ where the value $t_i$ is a total number of bindings considering all solutions from the named RDF graph; and
    ranking SPARQL query results based at least in part upon the normalized score for the match corresponding to the named RDF graph.

10. The method of claim 9, further comprising calculating a second normalized score for a second match.

11. The method of claim 9, further comprising filtering the search results to eliminate a result having the normalized score less than a threshold.

12. The method of claim 9, wherein the normalized score is absolute in that it is not based upon a number of named RDF graphs of the at least one of the named RDF graphs.

13. A computer implemented method for normalized ranking of semantic query search results, the method comprising:

forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a value $T_i$ where the value $T_i$ is a total number of triples from the named RDF graph; and ranking SPARQL query results based at least in part upon the normalized score for the match corresponding to the named RDF graph.

14. The method of claim 13, further comprising calculating a second normalized score for a second match.

15. The method of claim 13, further comprising filtering the search results to eliminate a result having the normalized score less than a threshold.

16. The method of claim 13, wherein the normalized score is absolute in that it is not based upon a number of named RDF graphs of the at least one of the named RDF graphs.

17. A computer system for normalized ranking of semantic query search results, comprising:

a computer processor to execute a set of program code instructions; and a memory to hold the program code instructions, in which the program code instructions comprises program code to perform, forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a number n where the number n is a number of triple patterns specified in the graph pattern; and ranking SPARQL query results based at least in part upon the normalized score for the match corresponding to the named RDF graph.

18. The computer system of claim 17, further comprising program code to perform calculating a second normalized score for a second match.

19. The computer system of claim 17, further comprising program code to perform filtering the search results to eliminate a result having the normalized score less than a threshold.

20. The system of claim 17, wherein the normalized score is absolute in that it is not based upon a number of named RDF graphs of the at least one of the named RDF graphs.

21. A computer system for normalized ranking of semantic query search results, comprising:

a computer processor to execute a set of program code instructions; and a memory to hold the program code instructions, in which the program code instructions comprises program code to perform, forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a number v where the number v is a number of distinct variables selected in the SPARQL query; and ranking SPARQL query results based at least in part upon the normalized score for the match corresponding to the named RDF graph.

22. A computer system for normalized ranking of semantic query search results, comprising:

a computer processor to execute a set of program code instructions; and a memory to hold the program code instructions, in which the program code instructions comprises program code to perform, forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a value $t_i$ where the value $t_i$ is a total number of bindings considering all solutions from the named RDF graph; and ranking SPARQL query results based at least in part upon the normalized score for the match corresponding to the named RDF graph.

23. A computer system for normalized ranking of semantic query search results, comprising:

a computer processor to execute a set of program code instructions; and a memory to hold the program code instructions, in which the program code instructions comprises program code to perform, forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a value $T_i$ where the value $T_i$ is a total number of triples from the named RDF graph; and ranking SPARQL query results based at least in part upon the normalized score for the match corresponding to the named RDF graph.

24. A computer program product embodied in a non-transitory computer readable medium, the computer readable medium having stored thereon a sequence of instructions which, when executed by a processor causes the processor to execute a process to implement normalized ranking of semantic query search results, the process comprising:

forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a number n where the number n is a number of triple patterns specified in the graph pattern; and ranking SPARQL query results based at least in part upon the normalized score for the match corresponding to the named RDF graph.

25. The computer program product of claim 24, the process further comprising calculating a second normalized score for a second match.

26. The computer program product of claim 24, wherein the normalized score is absolute in that it is not based upon a number of named RDF graphs of the at least one of the named RDF graphs.

27. The computer program product of claim 24, the process further comprising filtering the search results to eliminate a result having the normalized score less than a threshold.

28. A computer program product embodied in a non-transitory computer readable medium, the computer readable medium having stored thereon a sequence of instructions which, when executed by a processor causes the processor to execute a process to implement normalized ranking of semantic query search results, the process comprising:

forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a number v where the number v is a number of distinct variables selected in the SPARQL query; and ranking SPARQL query results based at least in part upon the normalized score for the match corresponding to the named RDF graph.

29. A computer program product embodied in a non-transitory computer readable medium, the computer readable medium having stored thereon a sequence of instructions which, when executed by a processor causes the processor to execute a process to implement normalized ranking of semantic query search results, the process comprising:

forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a value $t_i$ where the value $t_i$ is a total number of bindings considering all solutions from the named RDF graph; and ranking SPARQL query results based at least in part upon the normalized score for the match corresponding to the named RDF graph.

30. A computer program product embodied in a non-transitory computer readable medium, the computer readable medium having stored thereon a sequence of instructions which, when executed by a processor causes the processor to execute a process to implement normalized ranking of semantic query search results, the process comprising:

forming a SPARQL query comprising one or more graph patterns and specifying a collection of named RDF graphs;

executing, by a computer, the SPARQL query to retrieve at least one match corresponding to at least one of the named RDF graphs;

calculating a normalized score for a match of the at least one match corresponding to a named RDF graph of the at least one of the named RDF graphs, wherein the normalized score is calculated based at least in part upon a graph pattern of the one or more graph patterns, and the calculating comprises counting a value $T_i$ where the value $T_i$ is a total number of triples from the named RDF graph; and ranking SPARQL query results based at least in part upon the normalized score for the match corresponding to the named RDF graph.

* * * * *

UNITED STATES PATENT AND TRADEMARK OFFICE
CERTIFICATE OF CORRECTION

PATENT NO. : 9,229,930 B2
APPLICATION NO. : 13/595125
DATED : January 5, 2016
INVENTOR(S) : Sundara et al.

It is certified that error appears in the above-identified patent and that said Letters Patent is hereby corrected as shown below:

In the specification

In column 3, line 48, delete ""Action"" and insert -- "Action" --, therefor.

In column 11, line 22, delete "PTSN," and insert -- PSTN, --, therefor.

Signed and Sealed this
Sixteenth Day of August, 2016

Michelle K. Lee
*Director of the United States Patent and Trademark Office*